United States Patent Office 2,697,095
Patented Dec. 14, 1954

2,697,095

PENICILLIN SALTS OF GLYCINE-DIPHENYL-AMIDES

Gustav Ehrhart, Heinrich Ruschig, and Leonhard Stein, Bad Soden (Taunus), and Walter Aumüller, Frankfurt am Main-Unterliederbach, Germany, assignors to Farbwerke Hoechst Aktiengesellschaft vormals Meister Lucius und Brüning, Frankfurt am Main Hochst, Germany, a German company No Drawing. Application February 16, 1953,
Serial No. 337,246

Claims priority, application Germany February 18, 1952

4 Claims. (Cl. 260—239.1)

This invention relates to penicillin salts of the general formula $$(C_6H_5)_2.N.CO.CH_2.N\diagdown_{R_2}^{R_1} .Pc$$

in which $R_1$ stands for a member of the group consisting of H and lower alkyl, $R_2$ stands for lower alkyl, $$-N\diagdown_{R_2}^{R_1}$$

stands for a heterocyclic radical, and Pc stands for penicillin, especially penicillin G.

Penicillin salts, especially salts of penicillin G, have repeatedly been described in literature. They are widely used for the isolation and purification of penicillin G, for instance, the penicillin salt of N-ethylpiperidine, and also as depot-penicillins for therapeutic purposes. Depot-penicillins are preparations which, after injection, maintain a longer lasting penicillin level in the blood of men and animals than the inorganic salts of penicillin, for instance, sodium penicillin. The usefulness of organic penicillin salts for the said purpose is dependent on their difficult solubility in water, and their good tolerability when administered. Consequently, it is necessary that the bases of the salts possess themselves a good tolerability and low toxicity. As components of the depot-penicillins there are advantageously used substances having a local-anesthetic effect.

Now we have found that salts of penicillin, especially penicillin G, with ω-amino-acetic acid diphenylamides corresponding to the general formula

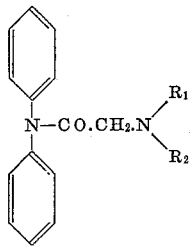

in which $R_1$ represents hydrogen or a lower alkyl radical, $R_2$ represents a lower alkyl radical and

stands for a heterocyclic radical, are of high therapeutic value and exhibit a strong depot effect.

The bases used are distinguished by their strong local-anesthetic effect, and, at the same time, by their low toxicity and very good tolerability when administered. The penicillin salts of these bases are sparingly soluble in water and are well tolerated when administered, and many of them crystallize well.

The new compounds are advantageously prepared on an industrial scale by reacting, for instance, the hydrochlorides of the bases with sodium penicillin G, both in an aqueous solution. After standing for some time and after addition of some crystals from a previous batch, the sparingly soluble penicillin salts crystallize in a good yield. However, it is also possible to react the free bases directly with penicillin. In this case, the reaction is advantageously carried out in an organic solvent, for instance, ethyl acetate, from which the desired salts are, at the appropriate concentration, obtained as well defined, coarse crystals by adding crystals from a previous batch.

The salts so obtained are suitable for the manufacture of depot-penicillins and of penicillin preparations for oral administration.

The following examples serve to illustrate the invention, but they are not intended to limit thereto:

EXAMPLE 1

PENICILLIN SALT OF ω-PYRROLIDINO-ACETIC-DIPHENYL-AMIDE (a) *Manufacture of ω-pyrrolidino-acetic-diphenyl-amide hydrochloride*

24.6 grams of ω-chloroacetic-diphenyl-amide (1/10 mol) and 14.2 grams of pyrrolidine (2/10 mol) are dissolved in 180 cc. of benzene and boiled for 6 hours under reflux. After cooling and standing overnight, the benzene solution is separated by decanting from the pyrrolidino-hydrochloride that has formed. A little ether is added to the decanted solution which is then extracted repeatedly with dilute hydrochloric acid. From the acid extracts the ω-pyrrolidino-acetic-diphenyl-amide is liberated by means of sodium carbonate and the base is taken up in ether. The solution is treated with animal charcoal and concentrated. Any pyrrolidine present is removed by distillation under reduced pressure. After cooling, the crude base is obtained in a good yield as crystal cake. For conversion into the hydrochloride, the crude base is dissolved in acetone and neutralized with alcoholic hydrochloric acid, if necessary, with addition of a little ether.

The ω-pyrrolidino-acetic-diphenylamide hydrochloride precipitates in a crystalline state. For purification, it is recrystallized from acetone. It melts at 189° C.

(b) *Manufacture of the penicillin salt, method A*

The aqueous solutions of 17.8 grams of sodium penicillin G and of 15.8 grams of ω-pyrrolidino-acetic-diphenyl-amide hydrochloride are combined, the quantity of water used amounting altogether to 120 cc. Crystals of a previous batch are added and the reaction mixture is placed in ice. After some time plenty of coarse crystals separate. In order to complete the crystallization, the mixture is allowed to stand for some time, advantageously overnight, the crystals are filtered off with suction, washed with water and dried in an exsiccator. 25 grams of ω-pyrrolidino-acetic-diphenyl-amide-penicillin G which decompose at 158° C. are obtained. The salt can be recrystallized by dissolution in methanol and slow addition of ether. The decomposition point is also at 158° C.

(c) *Manufacture of the penicillin salt, method B*

Equivalent quantities of penicillin G and ω-pyrrolidino-acetic-diphenyl-amide, dissolved in a little ethyl acetate, are combined. (The penicillin solution is prepared by dissolving the appropriate quantity of sodium penicillin G in water, adding phosphoric acid of 10 per cent. strength until a pH value=2 is reached, shaking out with ethyl acetate at as low a temperature as possible, washing with water and drying the solution with sodium sulfate.) On inoculation with crystals of a previous batch, coarse crystals of ω-pyrrolidino-acetic-diphenyl-amide-penicillate separate in a good yield. They decompose at 158° C. By carefully concentrating the mother liquor further quantities of the product can be obtained.

EXAMPLE 2

PENICILLIN SALT OF ω-DIETHYLAMINO-ACETIC-DIPHENYL-AMIDE (a) *Manufacture of the penicillin salt, method A*

The solutions of 17.8 grams of sodium penicillin G and of 15.95 grams of ω-diethylamino-acetic-diphenyl-amide hydrochloride in a total quantity of 60 cc. of water are combined. Crystals of a previous batch are added and the reaction mixture is allowed to stand in ice. The penicillin salt of ω-diethylamino-acetic-diphenyl-amide crystallizes out slowly. After standing for a prolonged time, the product is filtered off with suction, washed with cold water and dried in an exsiccator. The yield amounts to 21 grams. It melts at 131° C. with decomposition.

(b) *Manufacture of the penicillin salt, method B*

Equivalent quantities of penicillin G and ω-diethyl-amino-acetic-diphenyl-amide, dissolved in ethyl acetate, are combined as described in Example 1 (c). The solution is carefully concentrated and then inoculated by means of crystals of a previous batch. The penicillin salt of ω-diethylamino-acetic-diphenyl-amide crystallizes in a good yield in the form of coarse crystals. It is filtered off with suction and dried in an exsiccator. It melts at 131° C. with decomposition.

EXAMPLE 3

PENICILLIN SALT OF ω-N-PROPYLAMINO-ACETIC-DIPHENYL-AMIDE 1.78 grams of sodium penicillin G in 10 cc. of water and 1.53 grams of ω-n-propylamino-acetic-diphenyl-amide hydrochloride, dissolved in 10 cc. of water, are combined. By rubbing and inoculation with crystals of a previous batch, there is soon obtained in a good yield ω-n-propyl-amino-acetic-diphenylamide-penicillate in the form of crystals. After standing in ice, it is filtered off with suction and washed with water. After drying in an exsiccator, the salt can be recrystallized from ethyl acetate. It melts at 136° C. with decomposition.

We claim:

1. The penicillin salt of a diphenylamide of an amino-acetic acid selected from the group consisting of ω-pyrrolidino-acetic-diphenylamide, ω-diethylamino-acetic-diphenylamide, and ω-n-propylamino-acetic-diphenylamide.
2. The penicillin salt of ω-pyrrolidino-acetic-diphenylamide.
3. The penicillin salt of ω-diethylamino-acetic-diphenylamide.
4. The penicillin salt of ω-n-propylamino-acetic-diphenylamide.

References Cited in the file of this patent

UNITED STATES PATENTS

| Number | Name | Date |
|---|---|---|
| 2,539,483 | Ruskin | Jan. 30, 1931 |
| 2,625,543 | Ruskin | Jan. 13, 1953 |